(12) United States Patent
Jarvis et al.

(10) Patent No.: US 10,958,968 B2
(45) Date of Patent: Mar. 23, 2021

(54) SYSTEMS AND METHODS FOR STREAMING MEDIA MENU TEMPLATES

(71) Applicant: AOL Inc., Dulles, VA (US)

(72) Inventors: Peter Jarvis, San Jose, CA (US); Christopher Webster, Redwood City, CA (US); Christopher Habliston, San Jose, CA (US)

(73) Assignee: Verizon Media Inc., New York, NY (US)

( * ) Notice: Subject to any disclaimer, the term of this patent is extended or adjusted under 35 U.S.C. 154(b) by 102 days.

(21) Appl. No.: 15/473,874

(22) Filed: Mar. 30, 2017

(65) Prior Publication Data

US 2018/0288465 A1  Oct. 4, 2018

(51) Int. Cl.
| | | |
|---|---|---|
| *H04N 21/431* | (2011.01) | |
| *H04L 29/06* | (2006.01) | |
| *H04N 21/485* | (2011.01) | |
| *H04N 21/414* | (2011.01) | |
| *H04N 21/235* | (2011.01) | |
| *H04N 21/472* | (2011.01) | |
| *H04N 21/2668* | (2011.01) | |
| *H04N 21/258* | (2011.01) | |

(52) U.S. Cl.
CPC ....... *H04N 21/431* (2013.01); *H04L 65/4069* (2013.01); *H04N 21/2353* (2013.01); *H04N 21/25866* (2013.01); *H04N 21/2668* (2013.01); *H04N 21/41407* (2013.01); *H04N 21/47202* (2013.01); *H04N 21/4858* (2013.01)

(58) Field of Classification Search
CPC ............. H04N 21/431; H04N 21/4858; H04N 21/41402; H04N 21/25825; H04N 21/2353; H04N 21/47202; H04N 21/2668; H04N 21/25866; H04N 21/41407; H04L 65/4069
USPC ..................................... 725/37, 46; 715/810
See application file for complete search history.

(56) References Cited

U.S. PATENT DOCUMENTS

| | | | |
|---|---|---|---|
| 2006/0236342 A1* | 10/2006 | Kunkel | H04N 5/44543 725/52 |
| 2006/0248091 A1* | 11/2006 | Yamamoto | H04N 21/235 |
| 2007/0113246 A1* | 5/2007 | Xiong | H04N 5/445 |
| 2010/0162317 A1* | 6/2010 | Xu et al. | H04N 5/445 |
| 2012/0079429 A1* | 3/2012 | Stathacopoulos | G06F 17/30979 715/830 |
| 2012/0227011 A1* | 9/2012 | McCoy | H04N 21/25841 715/810 |

(Continued)

*Primary Examiner* — Anthony Bantamoi
(74) *Attorney, Agent, or Firm* — Bookoff McAndrews, PLLC

(57) ABSTRACT

A method of providing a menu for accessing media assets may include defining an media asset menu, defining an media asset menu item, the menu item including visibility criteria, adding the menu item to the defined menu, storing the defined menu, and distributing the stored menu to client devices over a network. A method of providing a menu for accessing media assets may include defining a new a menu for accessing media assets, loading a menu template from storage, the loaded menu template comprising a plurality of menu items, for each menu item among the plurality of menu items, determining if visibility criteria specified for the menu item are met, upon determining that the visibility criteria specified for the menu item are met, adding the menu item to the menu, otherwise excluding the menu item from the menu, and displaying the menu.

18 Claims, 10 Drawing Sheets

(56) References Cited

U.S. PATENT DOCUMENTS

| | | | |
|---|---|---|---|
| 2013/0347037 A1* | 12/2013 | Soroushian | H04N 21/26258 725/39 |
| 2015/0234820 A1* | 8/2015 | Aravamudan | G06F 16/735 707/769 |
| 2016/0142783 A1* | 5/2016 | Bagga | H04N 21/47214 725/47 |
| 2017/0280195 A1* | 9/2017 | Thomas | H04N 21/4668 |

* cited by examiner

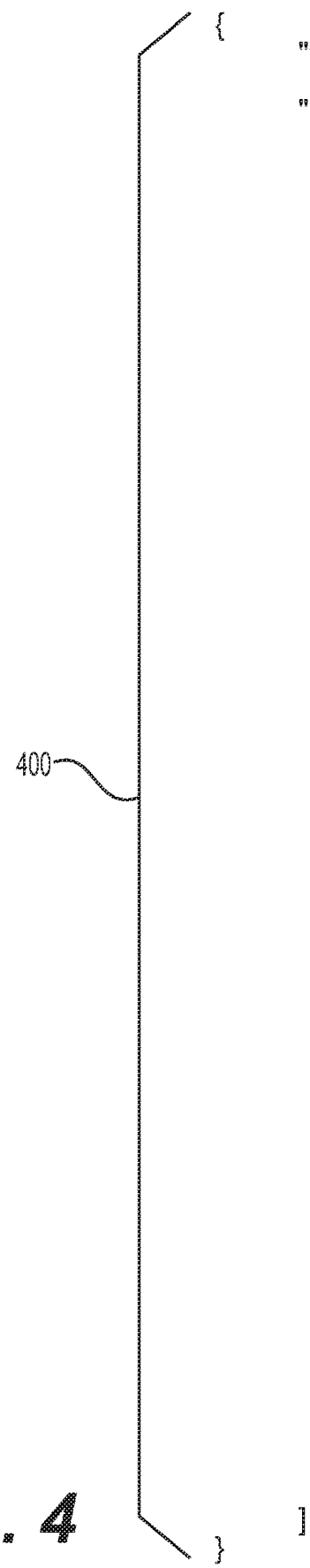

```
{
    "version":"0.0",

"menuTemplate":[
        {
            "itemType":"directitem",
            "id":"NotUsed",
            "name":"NBA",
            "pageType":"webView",
            "url":"/nba",
            "visibleIf":{
                "deviceType":[
                    "pc"
                ]
            }
        }, {
            "itemType":"directitem",
            "id":"NotUsed",
            "name":"Stream Pass",
            "pageType":"webView",
            "url":"/streampass",
            "separator":{
                "rowType":"breakLine"
            },
            "visibleIf":{
                "deviceType":[
                    "pc"
                ]
            }
        }, {
            "itemType":"directitem",
            "id":"NotUsed",
            "name":"Settings",
            "pageType":"settings",
            "visibleIf":{
                "deviceType":[
                    "phone",
                    "tablet"
                ]
            }
        }, {
            "itemType": "directitem",
            "id": "NotUsed",
            "name": "Logout",
            "pageType": "logout"
        }
    ]
}
```

FIG. 4

SYSTEMS AND METHODS FOR STREAMING MEDIA MENU TEMPLATES

TECHNICAL FIELD

Various embodiments of the present disclosure relate generally to retrieval and presentation of electronic media assets and, more particularly, to providing specialized menus for accessing electronic media assets.

BACKGROUND

Services providing online streaming electronic media such as, for example, video or audio, may provide a large number of electronic media assets across a large number of categories. Such media assets may be provided through an app provided on a mobile device, tablet, smart television, etc., through a website or other online portal, or though a dedicated software program running on a personal computer. In order to allow users to navigate through the available assets, streaming media services commonly provide a menu structure that may be based on category grouping and special features such as settings. Such a menu may be provided as part of the app or other software that delivers the media assets to the user. However, streaming media services may wish to update the menu structure dynamically, i.e., without releasing a new version of the software, to, for example, promote content, adjust to seasons (Christmas, Halloween, Super bowl, etc.), or to adjust to asset availability, etc. A streaming media menu definition may be complex in order to adapt dynamically to, for example, user types (registered, anonymous, etc.), network type (network provider, Wi-Fi, mobile phone, etc.), and the type of device (consumer electronic set top box, tablet, mobile phone, etc.). Thus, a streaming media menu definition may be to complex to be maintained and updated by non-software engineering staff operating the product, and may require an updated software release in order to support updated menu features Materializing a menu may involve calls to an external service, such as a video content grouping service to fill out generated menu items. A software application for presenting streaming media assets may also make subsequent calls to a video content grouping to get the images and text needed to materialize the menu. If these services are down or inaccessible, materialize the menu may not be materialized properly.

The menu is important to the user experience. If it cannot be materialized due to subsystem failures, the user will not be able to find and play content. This may be especially important during live events such as football and soccer games or music concerts. In these cases, many users arrive around the same time and may bring down communication services. If the menu is not available at the beginning of an event users may find an alternative source to access a streaming media asset. This may lead to loss of customer engagement and loss of revenue for the provider.

Accordingly, there is a need for systems and methods to provide dynamic updates of streaming media asset menus and for providing menus that can adapt to subsystem failures or loss of communications. The present disclosure is directed to overcoming one or more of these above-referenced challenges.

SUMMARY OF THE DISCLOSURE

According to certain aspects of the disclosure, systems and methods are disclosed for providing a menu for accessing online streaming media.

In one embodiment, a computer-implemented method is disclosed for providing a menu for accessing online streaming media. The method includes: defining an online streaming media asset menu, defining an online streaming media asset menu item, the menu item including visibility criteria, adding the menu item to the defined menu, storing the defined menu, and distributing the stored menu to client devices over a network.

In one embodiment, a computer-implemented method is disclosed for providing a menu for accessing online streaming media. The method includes: defining a new a menu for accessing online streaming media, loading a menu template from storage, the loaded menu template comprising a plurality of menu items, for each menu item among the plurality of menu items, determining if visibility criteria specified for the menu item are met, upon determining that the visibility criteria specified for the menu item are met, adding the menu item to the menu, upon determining that the visibility criteria specified for the menu item are not met, excluding the menu item from the menu, and displaying the menu.

In accordance with another embodiment, a system is disclosed for providing a menu for accessing online streaming media. The system comprises: a memory having processor-readable instructions stored therein; and a processor configured to access the memory and execute the processor-readable instructions, which when executed by the processor configures the processor to perform a plurality of functions, including functions to: define a new a menu for accessing online streaming media, load a menu template from storage, the loaded menu template comprising a plurality of menu items, for each menu item among the plurality of menu items, determine if visibility criteria specified for the menu item are met, upon determining that the visibility criteria specified for the menu item are met, add the menu item to the menu, upon determining that the visibility criteria specified for the menu item are not met, exclude the menu item from the menu, and display the menu.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts an exemplary menu definition for accessing online streaming media, according to one or more embodiments.

DETAILED DESCRIPTION OF EMBODIMENTS

Various embodiments of the present disclosure relate generally to retrieval and presentation of electronic media assets and to providing specialized menus for accessing electronic media assets.

A menu for navigating among streaming electronic media assets may be updated to respond to promoted assets, changes in available assets, or changes to communications availability. For example, a provider may wish to promote a particular product, such as an NBA stream pass. If menu definitions are tightly coupled with the provider's software, such as a web-based platform or a mobile app, a menu update to include the promotion would require the release of a new version of the software, which may require user action for deployment. However, if the menu definition is updated by non-technical operators without a new software release, then menu changes may add this item to the menu without the need for user action.

In addition, some menu information may require additional downloads from external servers for a full display. However, if the required servers or network communications in general are unavailable then it may not be possible to display the defined menu. Alternatively, if default menus that require fewer or no downloaded resources are defined within the provider's software then the user may still be able to access and view media assets.

The description below relates to systems and methods that may provide solutions for these challenges.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
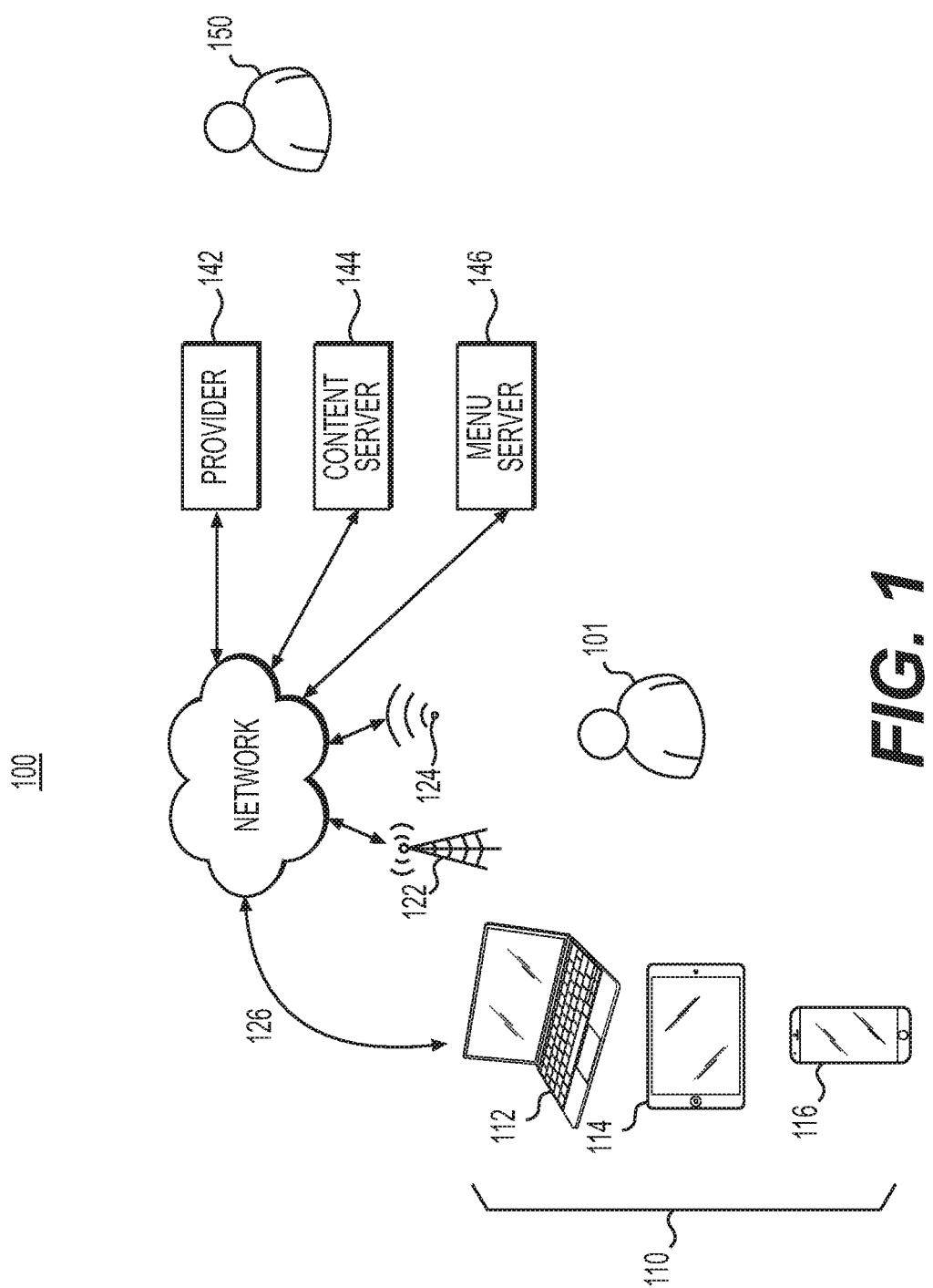
FIG. 1 depicts an exemplary system infrastructure for retrieving and displaying electronic media assets, according to one or more embodiments.

Any suitable system infrastructure may be put into place to allow for searching and presentation of electronic media assets. FIG. 1 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

As shown in FIG. 1, a consumer of electronic media assets, such as consumer 101, may employ an infrastructure 100 for retrieving and displaying electronic media assets in order to retrieve desired electronic media assets. Consumer 101 may interact with a client device 110 for retrieval of electronic media assets, such as a personal computer or laptop 112, a tablet 114, or a smart phone or mobile device 116. However, the device for retrieval of electronic media assets is not limited to these devices and may include, for example, a streaming digital media player, a gaming console, a set top box, a special purpose device, or any other device capable of receiving and playing electronic media assets. A device used to receive and play electronic media assets may display the electronic media assets and other user interface information on a built-in display device or on a suitable external display device, such as television or external video monitor. Client Device 110 may retrieve electronic media assets and information related to the electronic media assets from a content provider 142 and/or a content server 144 over a network 130. Network 130 may be a wide area network, such as the Internet, a local area network, or a cloud-based network, for example. Client device 110 may connect to network 130 by way of a local wireless network 124, such as, for example, a Wi-Fi network, a cellular data network 122, or a hard-wired network connection 126. In addition, client device 110 may retrieve information related to electronic media assets, such as menus, thumbnails, preview clips, text, etc., from a server, such as a menu server 146 over a computer network connection. The computer network connection may be the same or different from the network connection by which electronic media assets are received. Content provider 142, content server 144 and menu server 146 may be administered and maintained by an operator 150 who may, among other things, update and maintain menu definitions for accessing electronic media assets.

Figure 2A:
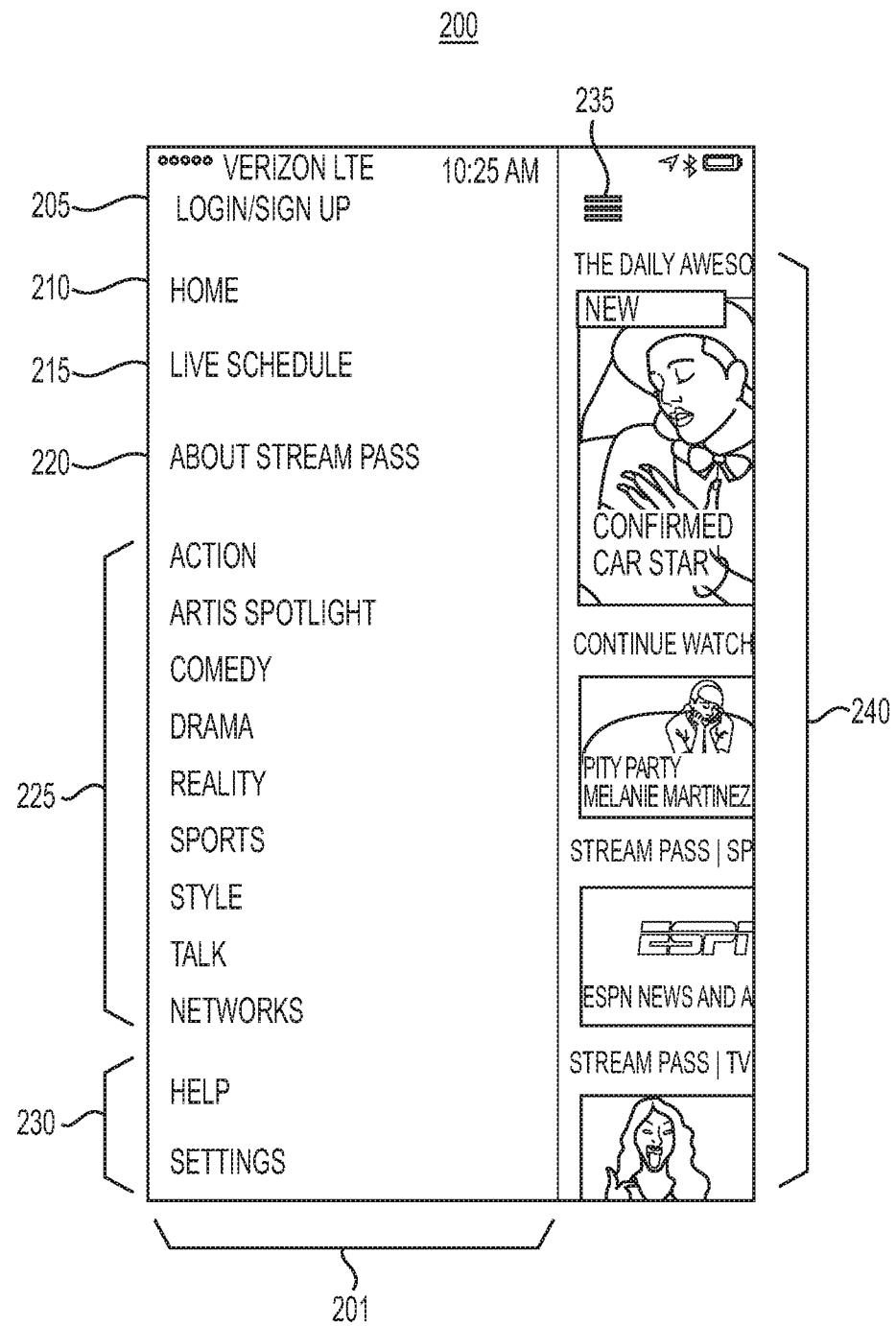
FIGS. 2A-2B depict exemplary user interfaces for retrieving and displaying electronic media assets, according to one or more embodiments.
Figure 2B:
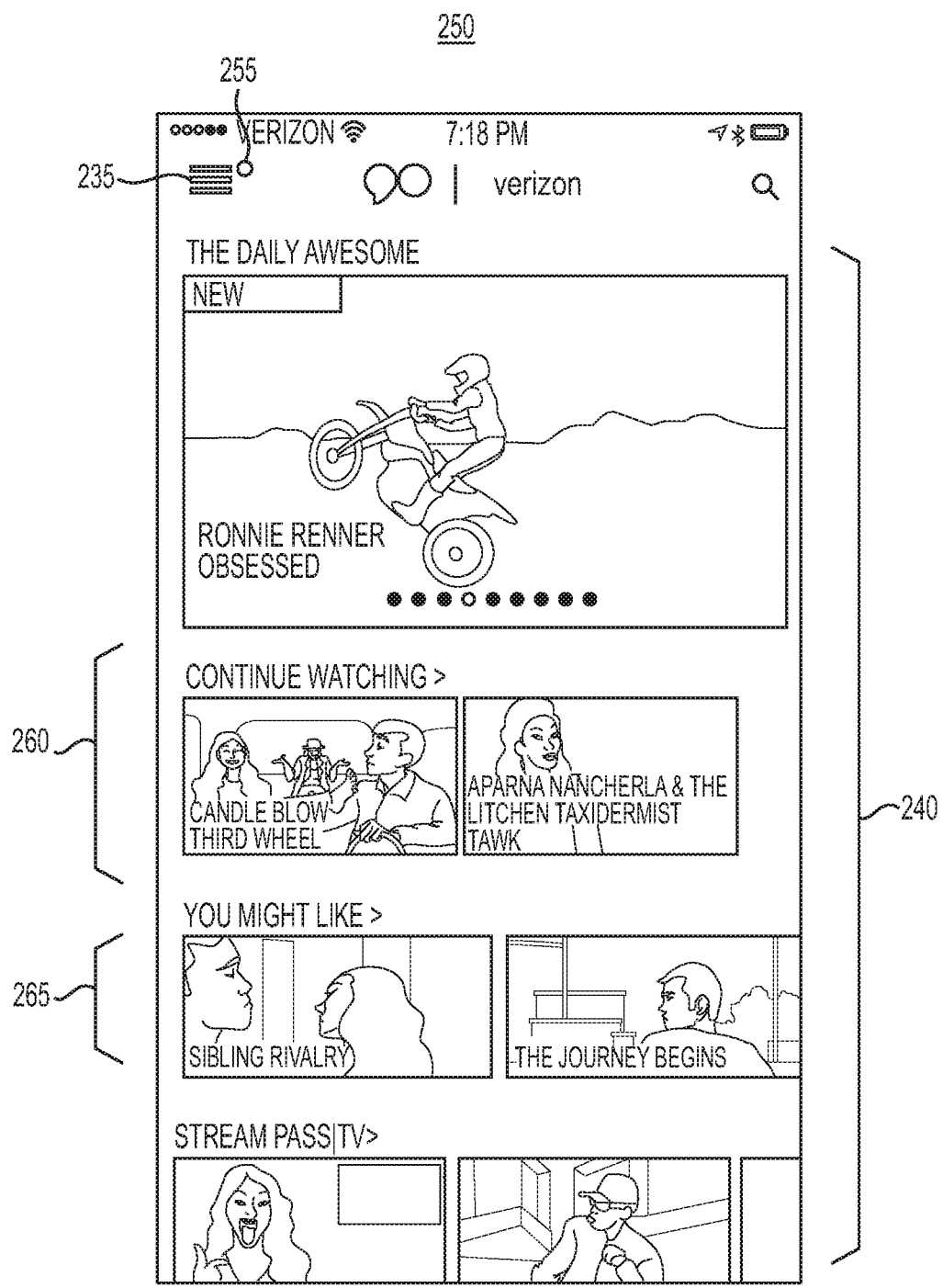

Consumer 101 may search for desired electronic media assets using the infrastructure for retrieving and displaying electronic media assets. For example, consumer 101 may interact with client device 110 to navigate through menus of available assets in order to find a desired electronic media asset. FIGS. 2A and 2B depict exemplary menus for accessing electronic media assets, according to one or more embodiments.

As shown in FIG. 2A, a user interface 200 for providing electronic media assets may include a menu section 201 and a content preview section 240. Within menu section 201 may be a plurality of selectable menu items. For example, the selectable menu items may include an item 205 to perform user account operations such as, for example, log in to an account or sign up for a new account, an item 210 to return to a top level or "home" section of a menu, an item 215, to access specially promoted assets or assets with common attributes such as, for example, live streamed media assets, an item 220 to access additional information, one or more items 225 to access assets associated with categories, such as, for example, comedies, dramas, sports, etc., and items 230 to access information and preferences relating to the provider's software platform, such as help information or application settings. User interface 200 may further include a control 235, such as, for example, a "thumb" or slider, to display or hide menu section 201 in order to display more or less of content preview section 240.

As shown in FIG. 2B, control 235 may be employed to hide menu section 201 in order to fully display content preview section 240. In this exemplary menu, personalized content for a registered user may be displayed. For example, an indicator may be displayed if there is new content in a category or series selected by the user. Such an indicator may be additional text or graphics displayed in the user interface such as, for example, an additional graphic 255 displayed adjacent to the control 235 as shown in FIG. 2A. Alternatively, such an indication may be provided by adding or altering a color or other display property of a portion of the user interface. For example, control 235 may be displayed as white or grey if no new content is available but in a color, such as green, if new content is available. Alternatively, or in addition, control 235 may be made to blink or move if new content is available. The user may select a category or series to be indicated for new content by, for example, adding the category or series to a "favorites" list or by editing properties associated with the category or series. Other personalized content for a registered user may include a list of content that was recently watched or for which viewing may be resumed, such as the "Continue Watching" portion 260 of content preview section 240 depicted in FIG. 2B. In addition, personalized content for a registered user may include a list of content items that are recommended to the user, such as the "You Might Like" portion 265 of content preview section 240 depicted in FIG. 2B. Such recommended items may be based, for example, on user demographics, user viewing history, user preferences, personal recommendations made by other users for the registered user of for users that are deemed to be similar to the registered user, viewing history and content ratings provided by users determined to be similar to the registered user in demographics or viewing history, etc.

Figure 3:
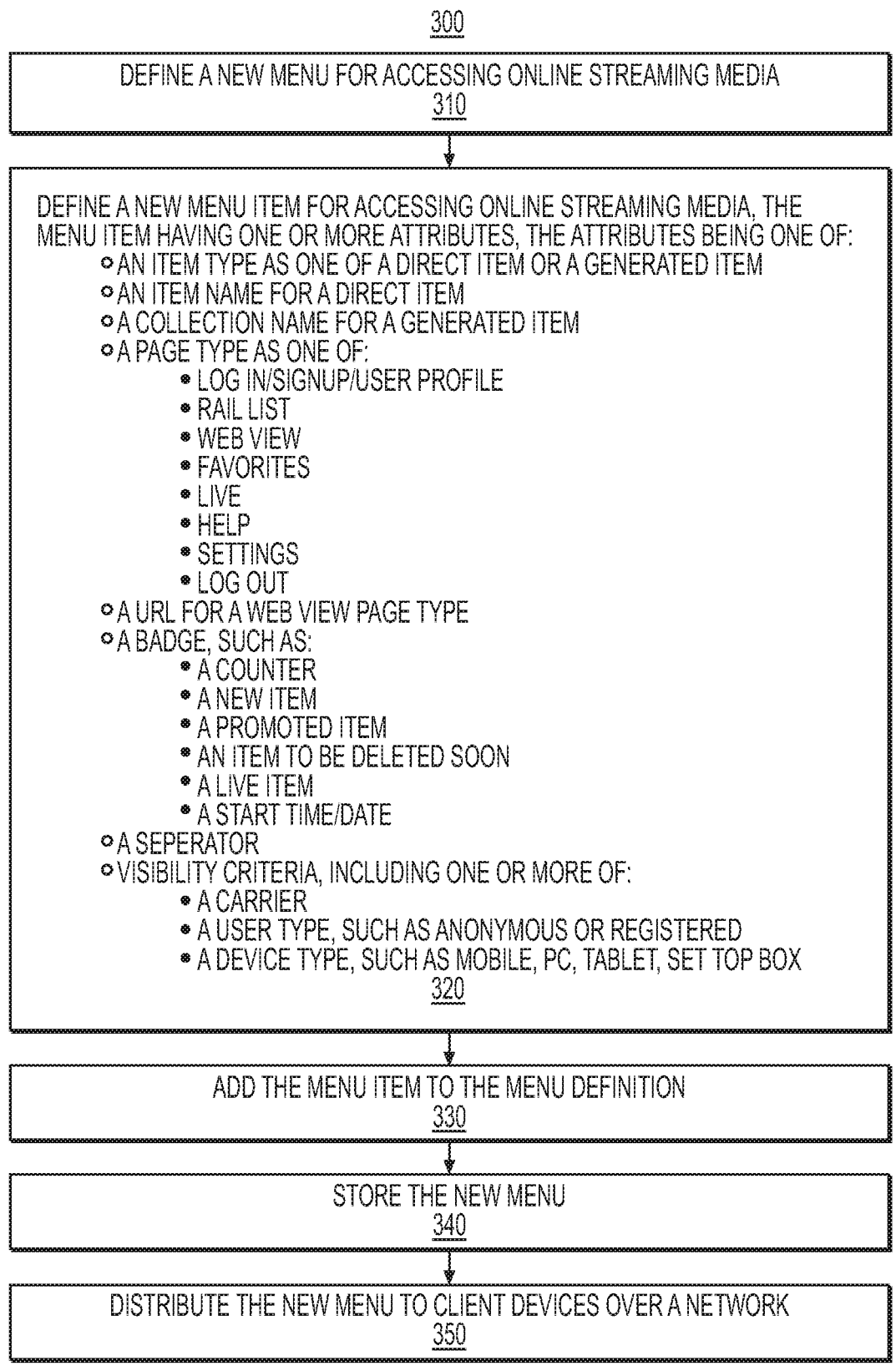
FIG. 3 depicts a flowchart of a method of providing a menu for accessing online streaming media, according to one or more embodiments.

A menu, such as menu 201 depicted in FIG. 2A, may be distributed with a provider's software platform for accessing electronic media assets. In some circumstances, a provider may wish to provide an update or a modification to a menu without providing an entire new release of the software platform. However, doing so may involve personnel of the provider, such as operator 150 depicted in FIG. 1, preparing a modified menu definition to be distributed separately from the provider's software platform. Operator 150 may be in a non-technical role for the provider, such as personnel other than a software developer, for example. As such, operator 150 may lack technical expertise to modify a menu provided as part of the provider's software platform. To allow operator 150 to provide a modified menu definition, there is a need for a method of specifying a menu definition that is separate from the provider's software platform and that may be performed by non-technical personnel. FIG. 3 depicts a flowchart of a method of providing a menu for accessing online streaming media, according to one or more embodiments.

As shown in FIG. 3, at operation 310, an operator, such as operator 150 depicted in FIG. 1, may, by way of a server, such as menu server 146 depicted in FIG. 1, define a new menu for accessing online streaming media. At operation 320, the operator may, by way of the server, define a new menu item for accessing online streaming media. The menu item may have one or more attributes, such as, for example, an item type as one of a direct item or a generated item as well as an item name for a direct item or a collection name for a generated item. Attributes may further include a page type, which may be one of, for example, a Log in, Signup, or User Profile type, a Rail List type, a Web View type, a Favorites type, a Live Event type, a Help, a Settings type, and a Log out type, etc. A Web View type may further include a uniform resource locator (URL). Attributes may further include a badge, which may be one of, for example, a counter, a new item, a promoted item, an item to be deleted soon, a live item, a start time/date, and a separator, etc. Attributes may further include visibility criteria, which may be one of, for example, a carrier, a user type, such as "Anonymous" or "Registered," etc., a device type, such as, for example, "Mobile," "PC," "Tablet," and "Set Top Box," etc. Other attribute types, each having additional attribute values may be provided based on the needs and capabilities of the provider. At operation 330, the operator may, by way of the server, add the menu item to the menu definition. At operation 340, the operator may, by way of the server, store the new menu. At operation 350, the operator may, by way of the server, distribute the new menu to client devices over a network.

FIG. 4 depicts an exemplary menu definition 400 for accessing online streaming media, according to one or more embodiments. As shown in FIG. 4, the menu definition may be stored in JavaScript Object Notation (JSON). However, any suitable data interchange format may be used such as, for example, Extensible Markup Language (XML), Hypertext Markup Language (HTML), comma separated values (CSV), Google Protocol Buffers, length encoded buffers, etc. Such data interchange formats may be provided as flat text files that may be edited directly by non-technical personnel, such as operator 150 depicted in FIG. 1.

Figure 5:
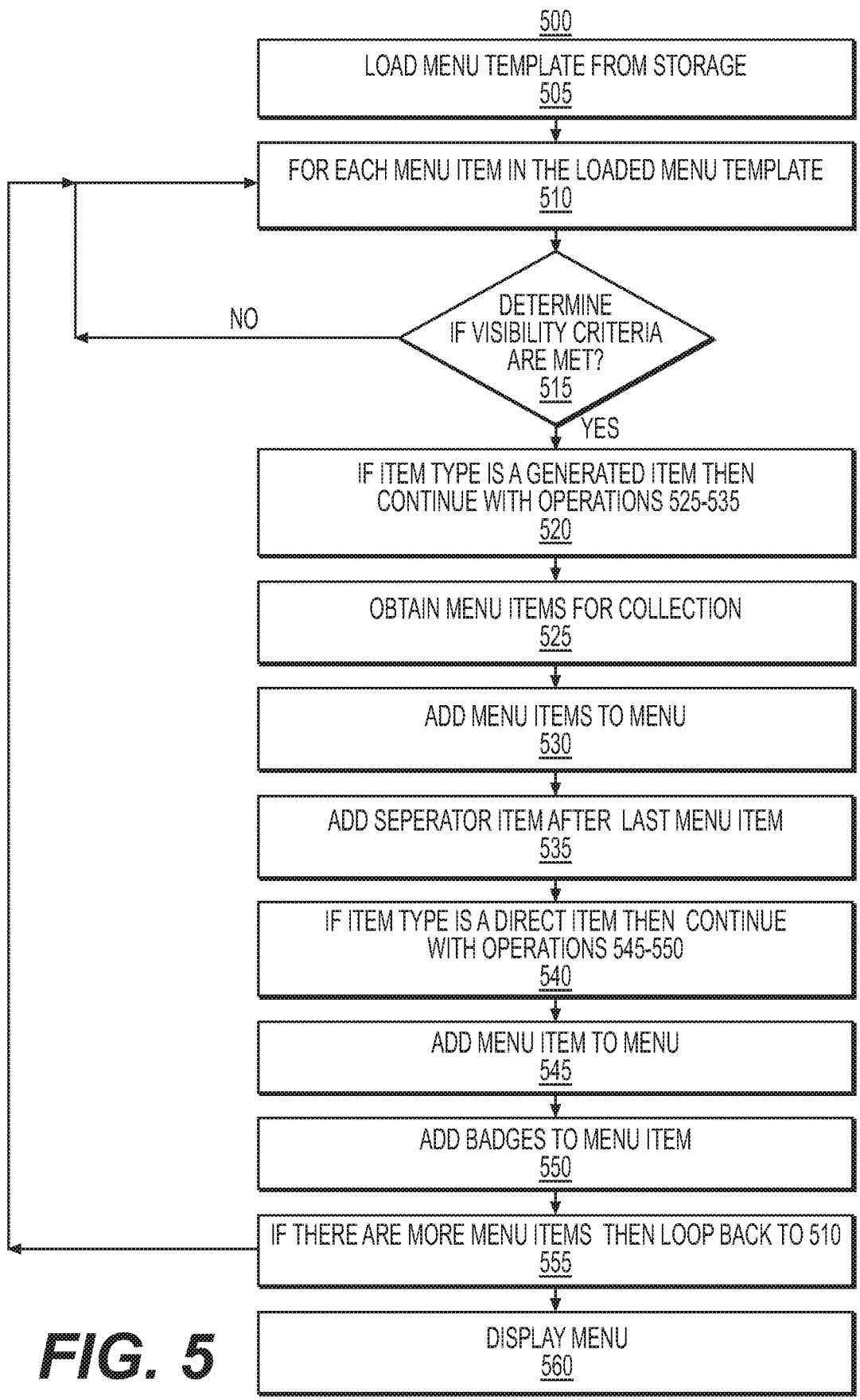
FIG. 5 depicts a flowchart of a method of providing a menu for accessing online streaming media, according to one or more embodiments.

Once a menu definition in a suitable data interchange format has been transmitted to a client device, such as client device 110 depicted in FIG. 1, the client device may read the menu definition to display the menu to the consumer. FIG. 5 depicts a flowchart of a method of providing a menu for accessing online streaming media, according to one or more embodiments. As shown in FIG. 5, at operation 505, the streaming media access device, such as client device 110 depicted in FIG. 1, may load menu template from storage. At operations 510 through 555, the streaming media access device may perform operations for each menu item in the loaded menu template. For example, at operation 515, the streaming media access device may determine if visibility criteria for the menu item are met. For example, visibility criteria for a menu item may include whether a current data carrier associated with the streaming media access device matches a specified carrier, whether a user type, such as, for example, a registered user or an anonymous user, matches a specified user type, and whether a device type, such as mobile, PC, tablet, set top box, etc., matches one of one or more specified device types. Multiple visibility criteria may be specified, and the specified visibility criteria may be combined using Boolean operators such as "and" and "or." For example, visibility criteria may specify that the current data carrier matches a specified carrier or that the user is a registered user. If the visibility criteria for the menu item are not met, the process may loop back to 510. If the visibility criteria for the menu item are met, the process may continue with operations 520-555. At operation 520, the streaming media access device may determine if the item type of the menu item is a generated item. If the item type of the menu item is a generated item then the process may continue with operations 525-535. At operation 525, the streaming media access device may obtain menu items for a collection associated with the menu item. At operation 530, the streaming media access device may add the obtained menu items to the menu. At operation 535, the streaming media access device may add a separator item after last obtained menu item. At operation 540, the streaming media access device may determine if the item type of the menu item is a direct item. If the item type of the menu item is a direct item then the process may continue with operations 545-550. At operation 545, the streaming media access device may add the direct menu item to the menu. At operation 550, the streaming media access device may add one or more badges to menu item. At operation 555, the streaming media access device may determine if there are more menu items. If there are more menu items then the process may loop back to 510. If there are no more menu items, then at operation 560, the streaming media access device may display the menu.

Figure 6:
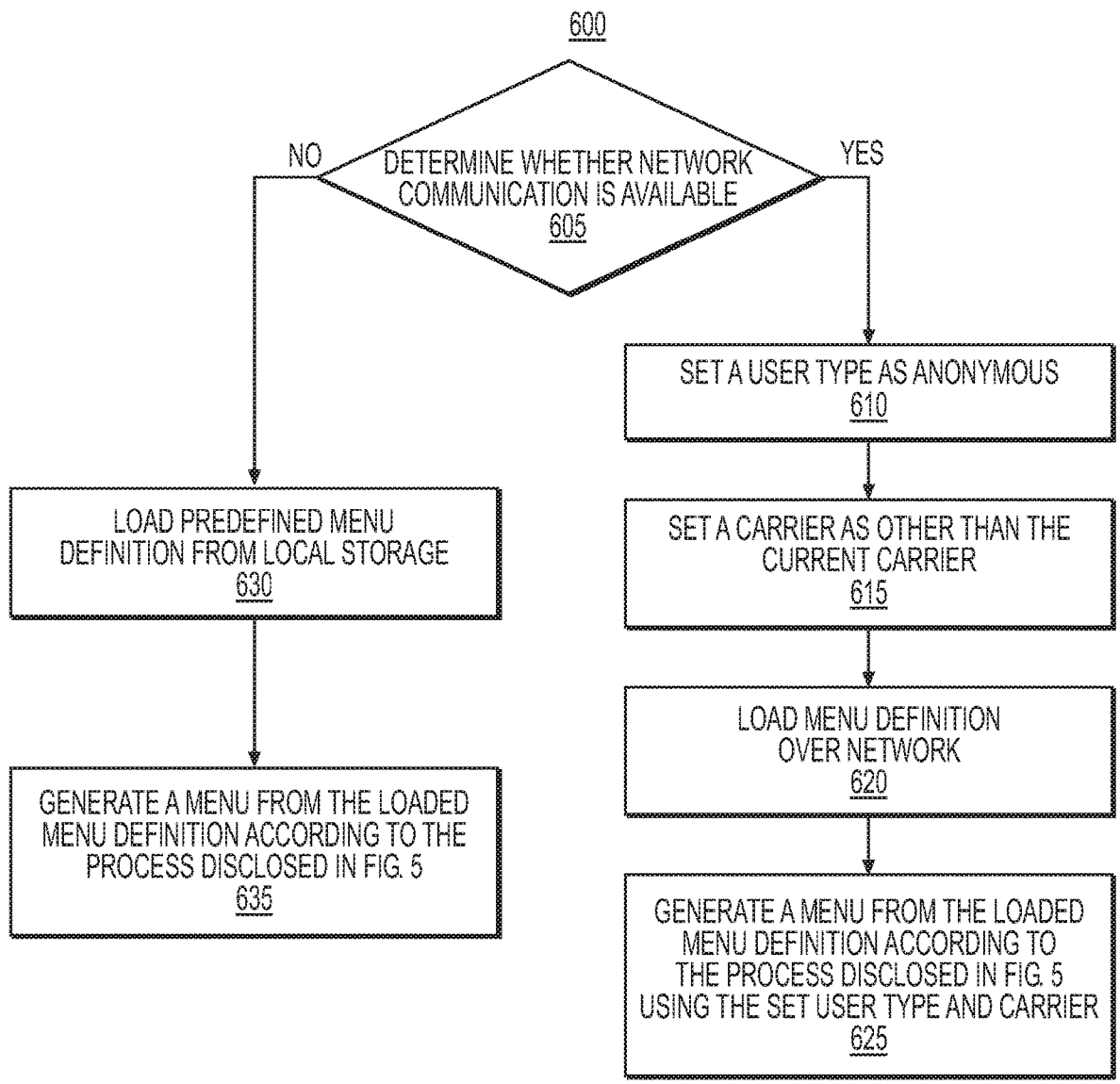
FIG. 6 depicts a flowchart of a method of providing a menu for accessing online streaming media, according to one or more embodiments.

Displaying a menu for accessing electronic media assets, such as menu 200 depicted in FIG. 2A, may include accessing a server associated with a content provider over a computer network. However, there may be circumstances in which the content provider server cannot be accessed or in which network communications are unavailable. In these circumstances, a menu may still be displayed, for example, by employing a "lowest common denominator" menu that displays a reduced set of available content in order to reduce dependence on the content provider server or by employing a minimal menu that is predefined and locally stored. A "lowest common denominator" menu may be determined by setting user attributes related to menu visibility to values that reduce the visibility of menu items. For example, a user type may be set to be an anonymous user and a carrier may be set to a carrier other than the content provider. However, other settings that reduce the visibility of menu items may be employed. Alternatively, a minimal menu may be determined by loading a predefined menu definition from local storage. Such a predefined menu definition may be a hard coded menu definition that is delivered with the content provider's software platform. The predefined menu definition may be updated periodically, such as every hour, every number of hours, every day, etc., depending on the availability of the content provider's servers and of network connectivity to the user's device, such as client device 110, depicted in FIG. 1. Electronic media assets referenced by the predefined menu definition may be playable directly from local storage at the user's device or from an accessible content provider server, such as content server 144, depicted in FIG. 1. FIG. 6 depicts a flowchart of a method 600 of providing a "lowest common denominator" menu or a minimal menu for accessing online streaming media, according to one or more embodiments.

As shown in FIG. 6, at operation 605, the user device may determine whether network communication is available. If it is determined that network communication is available then the user device may continue with operations 610-625. At operation 610, the user device may set a user type as "Anonymous." At operation 615, the user device may set a carrier as a carrier other than the content provider. At operation 620, the user device may load menu definition over network. At operation 625, the user device may generate a menu from the loaded menu definition according to the process disclosed in FIG. 5 using the set user type and carrier. If it is determined that network communication is not available then the user device may continue with operations 630-635. At operation 630, the user device may load a predefined menu definition from local storage. At operation 635, the user device may generate a menu from the loaded menu definition according to the process disclosed in FIG. 5.

Figure 7A:
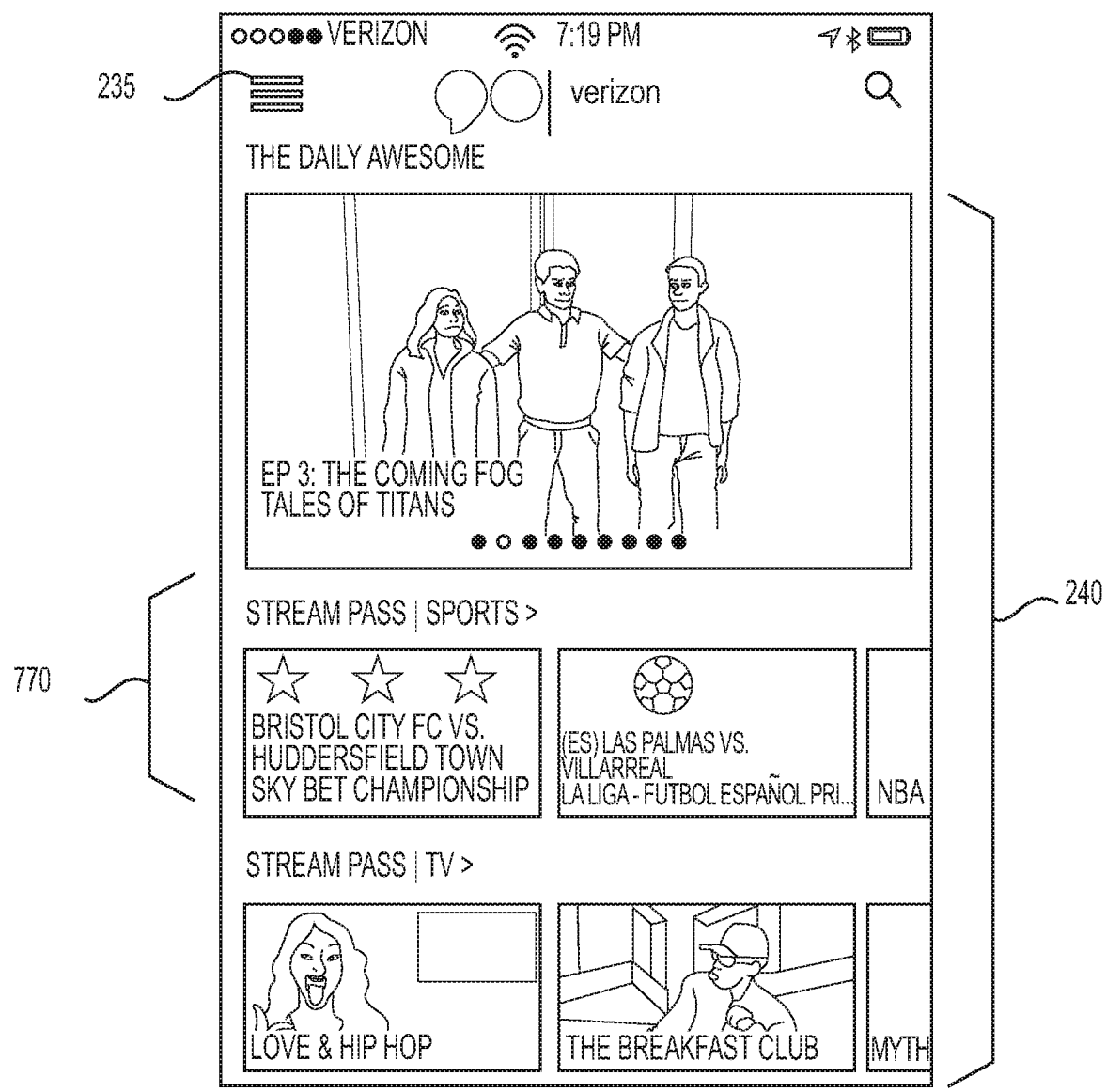
FIGS. 7A-7B depict exemplary user interfaces for retrieving and displaying electronic media assets, according to one or more embodiments.
Figure 7B:
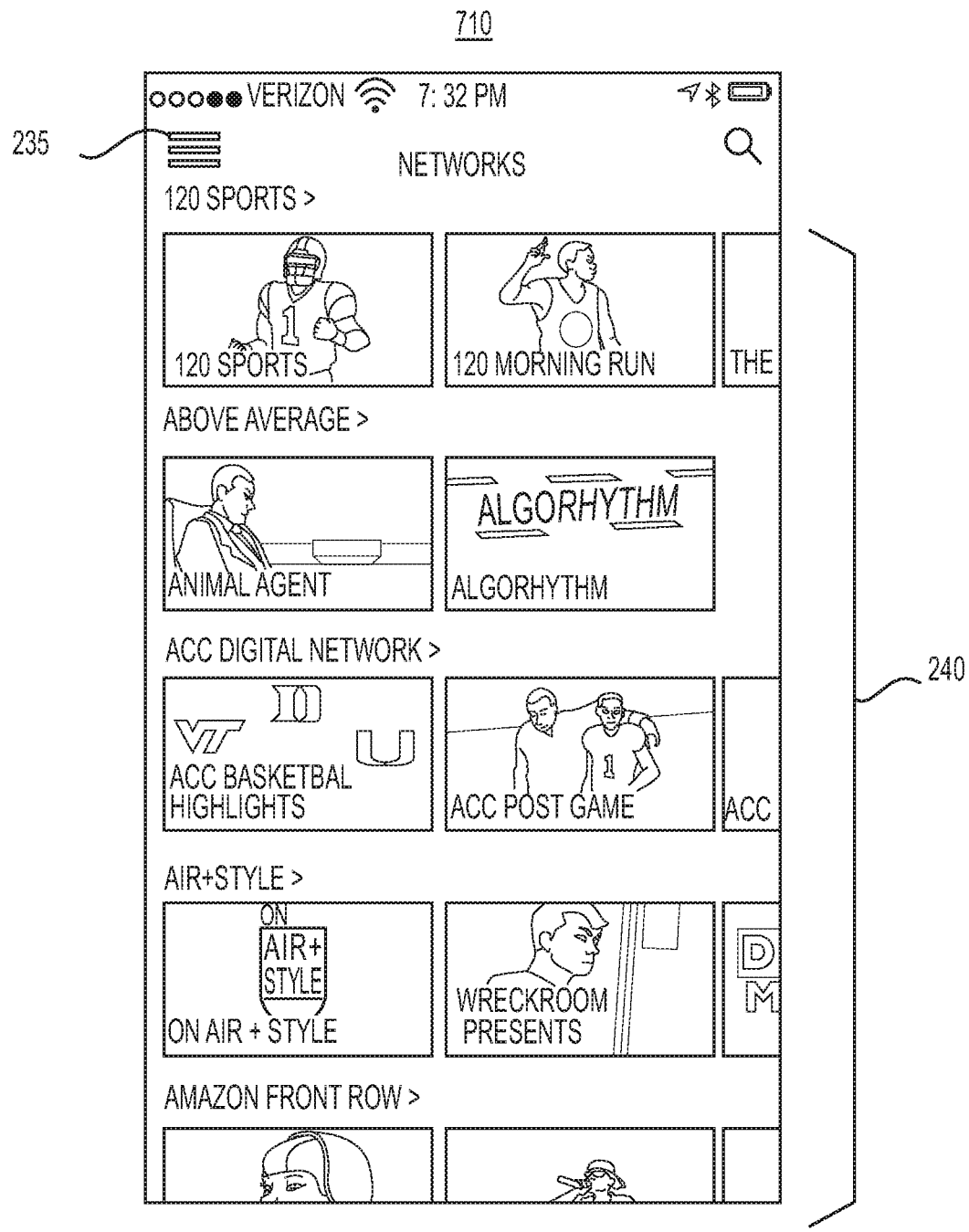

FIGS. 7A-7B depict exemplary user interfaces for retrieving and displaying electronic media assets, according to one or more embodiments. FIG. 7A depicts a "lowest common denominator" menu for accessing online streaming media, and a FIG. 7A depicts a minimal menu for accessing online streaming media. As shown in FIG. 7A, a "lowest common denominator" menu 700 may include content accessed from a content provider's network server, such as live streaming content 770. Such live streaming content may include live events such as sports events. Content accessed from a network server may also include content that was updated after the most recent access to the content provider by the consumer device. However, a "lowest common denominator" menu may not include features that make use of data obtained through the content provider. For example, a "lowest common denominator" menu may exclude personalized content for a registered user, such as that depicted in FIG. 2B. Thus, control 235 may not indicate the availability of new content. In addition, the "lowest common denominator" menu may not include a list of content that was recently watched or for which viewing may be resumed, or a list of content items that are recommended to the user. As shown in FIG. 7B, a minimal menu 710 may include only content accessed locally from the device or from a content delivery network, such as from a network server such as content server 144 depicted in FIG. 1. Such a menu may not include content accessed from a content provider's network server, such as live streaming content. In addition, such a menu may exclude personalized content for a registered user, such as that depicted in FIG. 2B.

Figure 8:
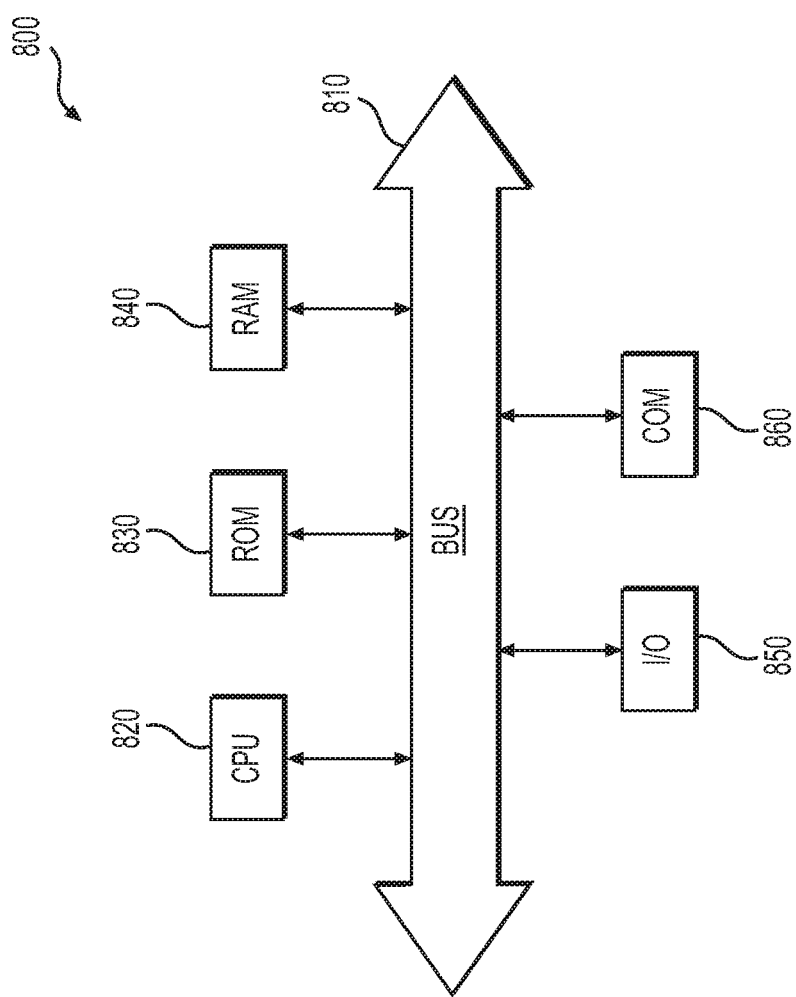
FIG. 8 depicts an exemplary device in which one or more embodiments may be implemented

FIG. 8 illustrates a high-level functional block diagram of an exemplary device 700, in which embodiments of the present disclosure, or portions thereof, may be implemented, e.g., as computer-readable code. For example, each of the exemplary systems, user interfaces and methods described above with respect to FIGS. 1-7 can be implemented in device 800 using hardware, software, firmware, tangible computer readable media having instructions stored thereon, or a combination thereof and may be implemented in one or more computer systems or other processing systems. Hardware, software, or any combination of such may implement each of the exemplary systems, user interfaces and methods described above with respect to FIGS. 1-7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-7 may be implemented using device 800. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 8, device 800 may include a central processing unit (CPU) 820. CPU 820 may be any type of processor device including, for example, any type of special purpose or a general purpose microprocessor device. As will be appreciated by persons skilled in the relevant art, CPU 820 also may be a single processor in a multi-core/multi-processor system, such system operating alone, or in a cluster of computing devices operating in a cluster or server farm. CPU 820 may be connected to a data communication infrastructure 810, for example, a bus, message queue, network, or multi-core message-passing scheme.

Device 800 may also include a main memory 840, for example, random access memory (RAM), and may also include a secondary memory 830. Secondary memory 830, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 830 may include other similar means for allowing computer programs or other instructions to be loaded into device 800. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 800.

Device 800 may also include a communications interface ("COM") 860. Communications interface 860 allows software and data to be transferred between device 800 and external devices. Communications interface 860 may include a modem, a network interface (such as an Ethernet card), a communications port, a PCMCIA slot and card, or the like. Software and data transferred via communications interface 860 may be in the form of signals, which may be electronic, electromagnetic, optical, or other signals capable of being received by communications interface 860. These signals may be provided to communications interface 860 via a communications path of device 800, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of providing a menu for accessing online streaming media, the method comprising:
   determining whether a server of a content provider of a specific item of video or audio content is accessible;
   upon determining that the server of the content provider is not accessible:
   setting a user type of a user associated with a streaming media access device as an anonymous user not registered with the content provider; and
   setting a current carrier as a carrier other than the current carrier for a device displaying the menu;
   loading an online streaming media asset menu template from storage, the loaded online streaming media asset menu template comprising a plurality of menu items, at least one menu item among the plurality of menu items corresponding to the specific item of video or audio content and including visibility criteria for display of the menu item, the visibility criteria including whether the user type of the user associated with the streaming media access device matches a specified user type, the specified user type being one of a user registered with the content provider of the specific item of video or audio content or an anonymous user not registered with the content provider of the specific item of video or audio content;

for each menu item among the plurality of menu items, determining if visibility criteria for display of the menu item included in the menu item are met;
upon determining that the visibility criteria for display of the menu item included in the menu item are met, adding the menu item to the menu;
upon determining that the visibility criteria for display of the menu item included in the menu item are not met, excluding the menu item from the menu; and
displaying the menu.

2. The method of claim 1, wherein the visibility criteria further includes one or more of whether a network data carrier associated with a streaming media access device matches a specified network data carrier, and whether a client device type of the streaming media access device matches a specified device type.

3. The method of claim 2, wherein the client device type is one of a mobile device, a personal computer, a tablet, a set top box, or a gaming console.

4. The method of claim 2, wherein the user type is one of a registered user or an anonymous user.

5. The method of claim 1, the method further comprising:
for each menu item among the plurality of menu items, determining whether an item type for the menu item is a generated item; and
upon determining that the item type for the menu item is a generated item: obtaining menu items for a collection of menu items associated with the menu item from a server over a computer network, adding the collection of menu items to the menu, and adding a separator item after last menu item.

6. The method of claim 1, the method further comprising:
upon determining that the server of the content provider is accessible:
adding personalized content to the menu based on a user profile of a user registered with the content provider.

7. The method of claim 1, wherein at least one menu item among the plurality of menu items specifies multiple visibility criteria combined using Boolean operators.

8. A computer system for providing a menu for accessing online streaming media, the system comprising:
a memory having processor-readable instructions stored therein; and
a processor configured to access the memory and execute the processor-readable instructions, which when executed by the processor configures the processor to perform a plurality of functions, including functions to:
determine whether a server of a content provider of a specific item of video or audio content is accessible;
upon determining that the server of the content provider is not accessible:
set a user type of a user associated with a streaming media access device as an anonymous user not registered with the content provider and
set a current carrier as a carrier other than the current carrier for a device displaying the menu;
load an online streaming media asset menu template from storage, the loaded online streaming media asset menu template comprising a plurality of menu items, at least one menu item among the plurality of menu items corresponding to the specific item of video or audio content and including visibility criteria for display of the menu item, the visibility criteria including whether the user type of the user associated with the streaming media access device matches a specified user type, the specified user type being one of a user registered with the content provider of the specific item of video or audio content or an anonymous user not registered with the content provider of the specific item of video or audio content;
for each menu item among the plurality of menu items, determine if visibility criteria for display of the menu item included in the menu item are met;
upon determining that the visibility criteria for display of the menu item included in the menu item are met, add the menu item to the menu;
upon determining that the visibility criteria for display of the menu item included in the menu item are not met, exclude the menu item from the menu; and
display the menu.

9. The computer system of claim 8, wherein the visibility criteria further includes one or more of whether a network data carrier associated with a streaming media access device matches a specified network data carrier, and whether a client device type of the streaming media access device matches a specified device type.

10. The computer system of claim 9, wherein the client device type is one of a mobile device, a personal computer, a tablet, a set top box, or a gaming console.

11. The computer system of claim 9, wherein the user type is one of a registered user or an anonymous user.

12. The computer system of claim 8, wherein the plurality of functions performed by the processor when executing the processor-readable instructions further includes functions to:
for each menu item among the plurality of menu items, determine whether an item type for the menu item is a generated item; and
upon determining that the item type for the menu item is a generated item: obtain menu items for a collection of menu items associated with the menu item from a server over a computer network, add the collection of menu items to the menu, and add a separator item after last menu item.

13. The computer system of claim 8, wherein the plurality of functions performed by the processor when executing the processor-readable instructions further includes functions to:
upon determining that the server of the content provider is accessible:
add personalized content to the menu based on a user profile of a user registered with the content provider.

14. A non-transitory machine-readable medium storing instructions that, when executed by a computing system, causes the computing system to perform a method for accessing online streaming media, the method comprising:
determining whether a server of a content provider of a specific item of video or audio content is accessible;
upon determining that the server of the content provider is not accessible:
setting a user type of a user associated with a streaming media access device as an anonymous user not registered with the content provider; and
setting a current carrier as a carrier other than the current carrier for a device displaying the menu;
loading an online streaming media asset menu template from storage, the loaded online streaming media asset menu template comprising a plurality of menu items, at least one menu item among the plurality of menu items corresponding to the specific item of video or audio content and including visibility criteria for display of the menu item, the visibility criteria including whether the user type of the user associated with the streaming media access device matches a specified user type, the specified user type being one of a user registered with the content provider of the specific item of video or audio content or an anonymous user not registered with the content provider of the specific item of video or audio content;

for each menu item among the plurality of menu items, determining if visibility criteria for display of the menu item included in the menu item are met;

upon determining that the visibility criteria for display of the menu item included in the menu item are met, adding the menu item to the menu;

upon determining that the visibility criteria for display of the menu item included in the menu item are not met, excluding the menu item from the menu; and displaying the menu.

15. The non-transitory machine-readable medium of claim 14, wherein the visibility criteria further includes one or more of whether a network data carrier associated with a streaming media access device matches a specified network data carrier, and whether a client device type of the streaming media access device matches a specified device type.

16. The non-transitory machine-readable medium of claim 14, the method further comprising:

for each menu item among the plurality of menu items, determining whether an item type for the menu item is a generated item; and upon determining that the item type for the menu item is a generated item: obtaining menu items for a collection of menu items associated with the menu item from a server over a computer network, adding the collection of menu items to the menu, and adding a separator item after last menu item.

17. The non-transitory machine-readable medium of claim 14, the method further comprising:

upon determining that the server of the content provider is accessible:

adding personalized content to the menu based on a user profile of a user registered with the content provider.

18. The non-transitory machine-readable medium of claim 14, wherein at least one menu item among the plurality of menu items specifies multiple visibility criteria combined using Boolean operators.

* * * * *